United States Patent Office 3,113,981
Patented Dec. 10, 1963

3,113,981
NOVEL ALKYLATION CATALYST
Henry George Ellert and Charles Newton Kimberlin, Jr., Baton Rouge, La., assignors to Esso Research and Engineering Company, a corporation of Delaware
No Drawing. Filed Aug. 8, 1960, Ser. No. 47,932
6 Claims. (Cl. 260—671)

The present invention relates to the condensation of aromatic compounds with paraffinic compounds. More specifically, the present invention is concerned with the alkylation of aromatic compounds with paraffinic compounds. Still more specifically, the present invention relates to these alkylation reactions in the presence of a novel alkylation catalyst.

In S.N. 856,392, filed December 1, 1959, now U.S. Patent No. 3,023,157, of which the present application is a continuation-in-part, there is described and disclosed a novel hydrocarbon conversion catalyst consisting of vaporized hydrogen fluoride and activated carbon. This catalyst system, at elevated temperatures, was active in converting relatively low molecular weight hydrocarbons, such as virgin naphthas, decane and similar materials, into aromatic compounds. Under similar reaction conditions, neither activated carbon alone nor vaporized HF alone was an active catalyst for this reaction. Furthermore, liquid HF with or without carbon, produced an entirely different product substantially free of aromatics.

It has now been found that the catalyst system consisting of activated, high surface area carbon and vaporized hydrogen fluoride is a highly active and selective aromatics alkylation catalyst, and the reaction proceeds in a manner substantially different from that observed with the familiar liquid phase aqueous or anhydrous HF reagent.

Considering first the reaction of paraffin-aromatic feed mixture, the HF vapor activated carbon system catalyzed selective coupling of the two components to yield an alkylaromatic, the alkyl substituent having the same carbon number and skeletal structure as the paraffin feed component, and an equivalent of hydrogen. No isomerization or disproportionation of the paraffin or the aromatic (if an alkylaromatic is used as feed) is obtained. If, however, an alkylaromatic is present in feed, self-condensation will occur to an extent determined mainly by concentration. In contrast, liquid HF catalyzes isomerization, disproportionation and cracking of similar feeds, but does not catalyze this selective alkylation or coupling.

The difference between the HF vapor/activated carbon and the liquid HF catalysts in olefin-aromatic alkylation is somewhat more subtle. The HF vapor/activated carbon catalyst gives exclusively the ortho, para and 1,2,4 oriented products. No meta or 1,3,5 products are obtained. Liquid HF catalyst, on the other hand, gives a mixture of alkylated products including the meta and 1,3,5 oriented products, the over-all product mixture approaching thermodynamic equilibrium in composition.

It is, of course, highly desirable to convert paraffins and in particular the saturated paraffins, into the far more valuable alkylated aromatic compounds, which have high utility as intermediate in the manufacture of detergents, wetting agents and other products of commerce. Though alkylate reactions are not new, the present invention affords a cheap and selective route to this reaction, making a minimum amount of secondary reaction product.

In accordance with the present invention, alkylated aromatics are prepared by reacting paraffins with aromatics or alkylaromatics in the presence of HF vapor and high surface area activated carbon. Alternately, alkylated aromatics such as ethylbenzene and cumene, when processed in the absence of appreciable amounts of paraffins and olefins, are condensed to tricyclic compounds of the dialkyl-dihydro-anthracene type.

The paraffin-aromatic alkylation and the alkylaromatic condensation occur at temperatures of 600° to 1100° F., and preferably 800° to 1000° F. The weight ratio of HF vapor to hydrocarbon may range from 0.1 to 4.0, but is generally held at 0.5 to 2.0 for all three reactions. Liquid hydrocarbon space velocities of from 0.05 to 4.0 based on the activated carbon charge are satisfactory, the lower of the range being preferred in the paraffin-aromatic and alkylaromatic conversions. The process pressure may range from 0 to 200 p.s.i.g., but is preferably maintained at 0 to 30 p.s.i.g.

The process and nature of the present invention can best be understood from the experimental data detailed below.

Example I

The substantial inertness of gaseous hydrogen fluoride in the presence of paraffinic hydrocarbons but in the absence of activated carbon is illustrated by an experiment wherein a mixture of 2.9 parts of anhydrous HF and 1 part by weight of normal dodecane was passed through an empty Monel tube at 0.4 total hourly space velocity at 920° F. Less than 5% conversion to gas was obtained, and the recovered liquid was essentially pure dodecane. Essentially the same results were obtained when an inert packing, such as Monel Gauge and Copper Shot were employed as reactor packing.

Example II

A 2/1 mol ratio mixture of isopentane and cumene (isopropyl benzene) was passed with 68 weight percent on hydrocarbon of vaporized anhydrous HF over activated carbon at 850° F. and 0.72 v./v./hr. (total liquid). The liquid product, excluding isopentane and experimental losses, amounted to 88 wt. percent of the cumene charged, and had the following composition.

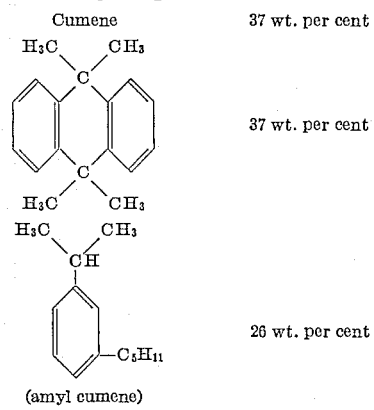

| | |
|---|---|
| Cumene | 37 wt. per cent |
| (dimethyl dihydroanthracene structure) | 37 wt. per cent |
| (amyl cumene) | 26 wt. per cent |

The yield of the polynuclear compound could be increased by decreasing the paraffin content of the feed; the yield of the alkyl aromatic by increasing the paraffin content.

This example demonstrates the embodiment of the present invention whereby it is possible to prepare alkylated aromatics from paraffins rather than from the more expensive olefin.

The reaction in the presence of carbon is particularly surprising, not only in view of the inertness of gaseous HF without it, but also in view of the fact that activated carbon in well-known dealkylation catalyst and is, in fact, used commercially in dealkylation of aromatics.

Example III

The reaction of vaporized HF/active carbon is distinctly different from that obtained with liquid HF catalyst. In experiments carried out with cumene/isobutane mixture and liquid HF catalyst, none of the paraffin was incorporated in the aromatic product, and disproportionation of the aromatic was the main reaction. In this case the over-all reaction is best described by the following equation.

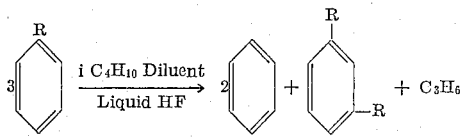

In a typical experiment, an isobutane/cumene mixture (6.5/1 mol ratio) was heated in an autoclave with 1.73 weights of liquid HF for 2 hours at 250° F. The aromatic products were obtained in the following weight percent yields based on cumene: benzene, 26.8; toluene, 2.4; $C_8$ aromatics, 6.4; cumene, 11.5; $C_{10}$ aromatics, 1.1; and $C_{12}$ aromatics, 23.5. If the reaction occurred in the same way as in the vaporized HF/carbon system, $C_{13}$ alkylbenzene and the $C_{18}$ polynuclear aromatic would have been major products.

What is claimed is:

1. An improved process for alkylating aromatic hydrocarbons with paraffinic hydrocarbons which comprises contacting an admixture consisting of both aromatics and paraffins in the vapor phase in an alkylation zone at a temperature of about 600 to 1100° F. with vaporized hydrogen fluoride in the presence of a high surface area contacting agent substantially inert to HF.

2. The process of claim 1 wherein said contacting agent is activated carbon.

3. The process of claim 2 wherein the pressure in said reaction zone is betwen 0–200 p.s.i.g.

4. The process of claim 2 wherein the HF to oil ratio is in the range of 0.1 to 4.0.

5. An improved process for alkylating an aromatic hydrocarbon with an isoparaffin which comprises passing an admixture consisting of both aromatics and isoparaffins to an alkylation zone, contacting said reactants in the vapor phase with vaporized HF and activated carbon at a temperature of from about 800 to 1000° F. and a pressure of atmospheric to about 30 p.s.i.g. and recovering an alkylated aromatic compound from said zone.

6. The process of claim 5 wherein said aromatic is cumene.

References Cited in the file of this patent
UNITED STATES PATENTS
3,023,157     Ellert et al. _ _ _ _ _ _ _ _ _ _ _ _ Feb. 27, 1962